Figure 5:
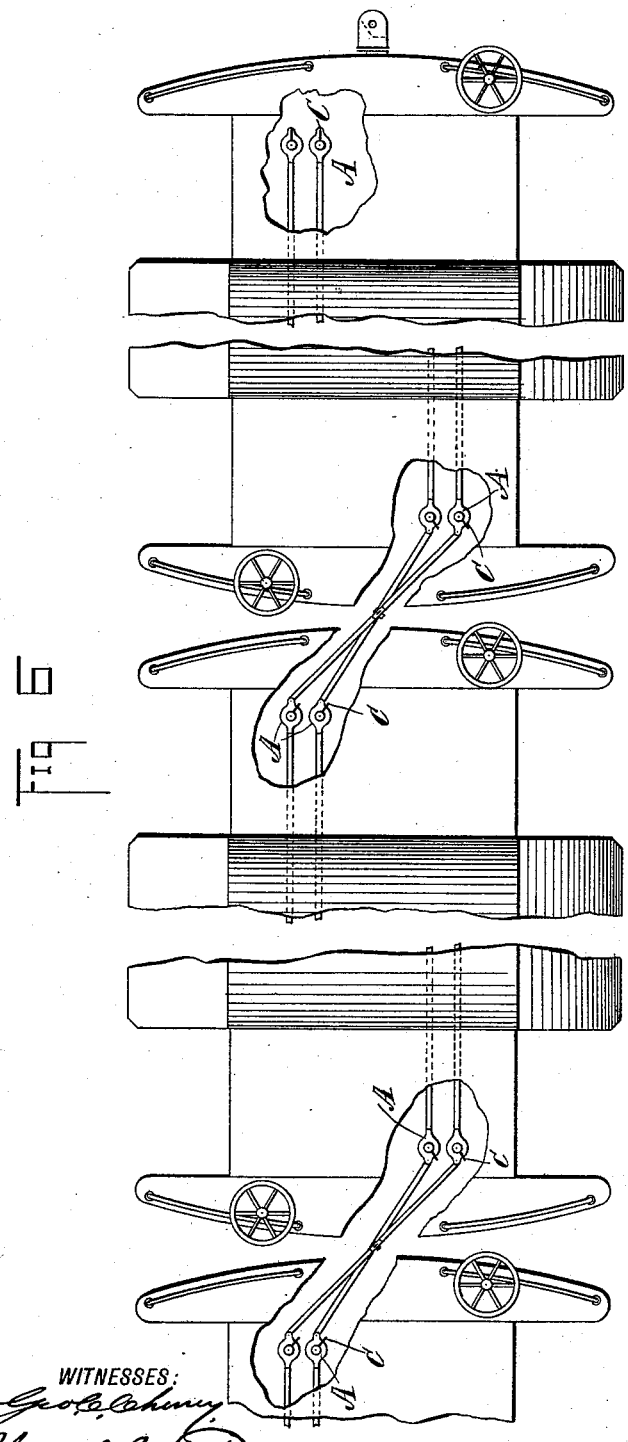

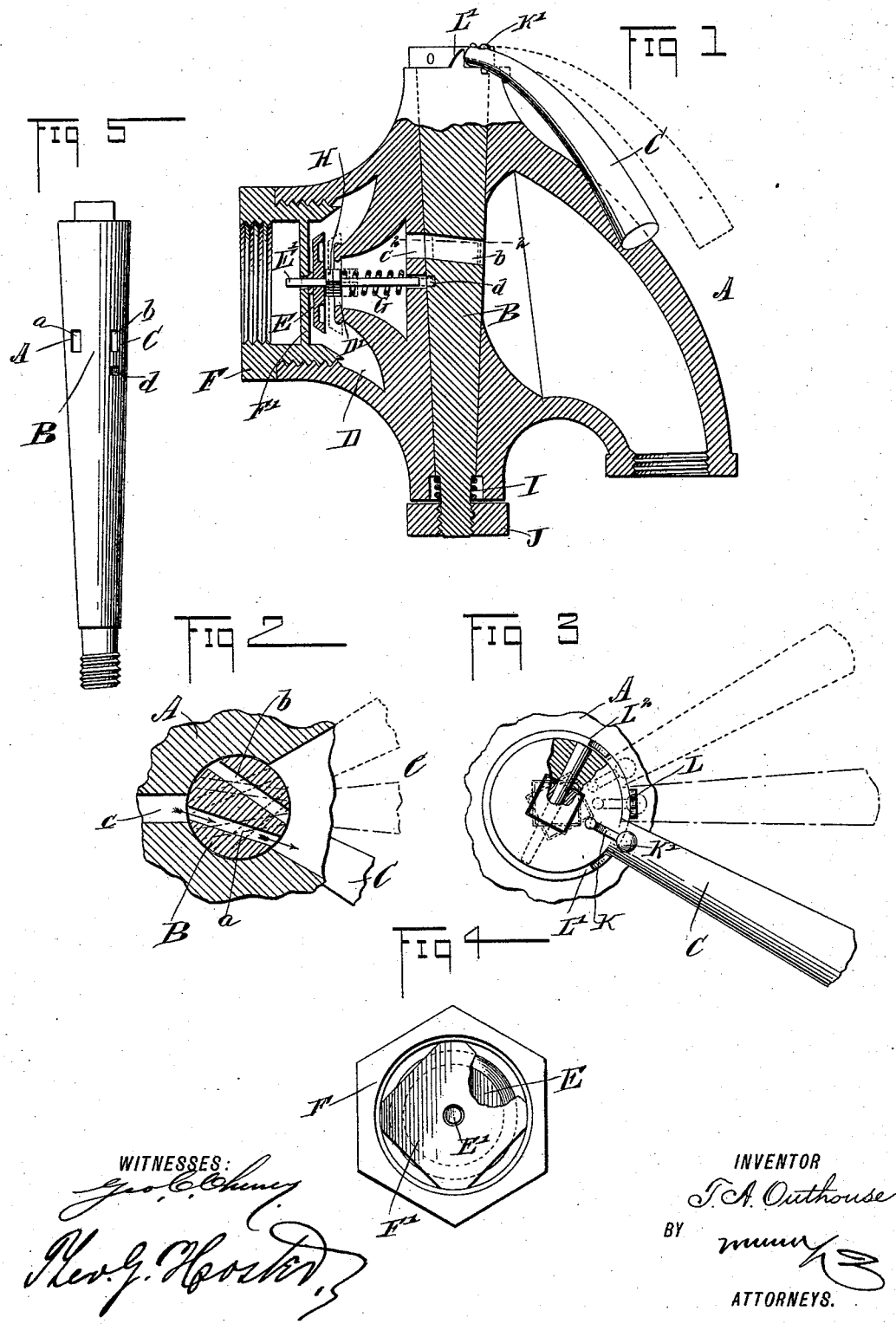

(No Model.) 2 Sheets—Sheet 2.

T. A. OUTHOUSE.
ANGLE COCK.

No. 571,201. Patented Nov. 10, 1896.

WITNESSES:

INVENTOR.
T. A. Outhouse.
BY
ATTORNEYS.

UNITED STATES PATENT OFFICE.

THOMAS A. OUTHOUSE, OF MOUNT OLIVE, ILLINOIS, ASSIGNOR TO HIMSELF AND ALBERT BOHLER AND EDWARD H. MEYER, OF SAME PLACE.

ANGLE-COCK.

SPECIFICATION forming part of Letters Patent No. 571,201, dated November 10, 1896.

Application filed June 13, 1896. Serial No. 595,378. (No model.)

*To all whom it may concern:*

Be it known that I, THOMAS A. OUTHOUSE, of Mount Olive, in the county of Macoupin and State of Illinois, have invented a new and Improved Angle-Cock, of which the following is a full, clear, and exact description.

The invention relates to fluid-pressure brakes; and its object is to provide a new and improved angle-cock arranged to automatically cause an application of the brakes in the rear section of a train when the latter has parted or the hose has burst, without, however, applying the brakes in the front section of the train.

The invention consists principally of a valve arranged in the cock-body and controlling ports in the angle-cock key.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is an enlarged sectional plan view of the same on the line 2 2 of Fig. 1. Fig. 3 is a plan view of part of the same with parts in section. Fig. 4 is an end elevation of the improvement with part broken out. Fig. 5 is a side elevation of the angle-cock key, and Fig. 6 is a plan view of the improvement as applied and with parts broken out.

The improved angle-cock is provided with a body A, in which is mounted to turn a key or plug B, provided with a handle C for manipulating the said key. In the latter are formed ports $a$ and $b$, adapted to connect one end of the body with a port $c$, opening into a chamber D, arranged in the other end of the said body. This chamber D is formed with a valve-seat D', adapted to be engaged by a disk valve E, secured on a valve-stem E', fitted to slide at its inner end in a bearing in the bottom of the chamber D, while the outer end of the said stem is mounted to slide in the bridge or spider F', formed transversely in the nut F, screwing in the outer end of the body A, it being understood that the nut F is threaded on its inside to connect with the threaded end of the train-pipe extending under the car. The other end of the angle-cock body A is connected in the usual manner with the end of the hose for connecting two cars with each other, as indicated in Fig. 6.

On the valve-stem E' is coiled a spring G, resting with its inner end on the bottom of the chamber D and pressing with its outer end on nuts H, screwing on the stem E', to permit of adjusting the tension of the said spring G, the function of which is to hold the disk valve E normally off the seat D'.

In the key B and in alinement with the valve-stem E' is arranged a recess $d$, adapted to be engaged by the inner end of the said valve-stem to permit the valve E to move to its seat D', as hereinafter more fully described. When the key B is turned so that the recess $d$ is out of alinement with the said stem E', then the inner end of the stem abuts against the peripheral surface of the key B, and consequently the disk valve E is then prevented from moving to its seat even if pressure is applied on the said disk valve in an inward direction.

In order to hold the key B to its seat, I provide a spring I, set in a recess in the valve-body and pressing at one end on the said key and the other on a nut J, secured to the small end of the key B. The key is adapted to be turned into three positions, namely, first, with the port $a$ in register with the port $c$; second, with the port $b$ in register with the port $c$, and an intermediate position with the port $c$ standing midway between the ports $a$ and $b$ and not registering with either. In order to hold the key B in this position, I provide a spring K, secured to the handle C and carrying at its free end a pin K', extending through the handle C to engage with its lower end two lugs L, attached to the body A. The extreme right and left hand positions of the handle C are limited by lugs L' and L², formed on the body A, as illustrated in Figs. 1 and 3.

The operation is as follows: When the device is in use, then the angle-cock at the front end of the car is set to the first-named position, namely, so that the key B registers by its port $a$ with the port $c$. The angle-cock at the rear of the car is in the second position, that is, with the key B having its port $b$ in register with the port $c$ and the recess $d$ in alinement with the valve-stem $E'$. The angle-cock at the rear of the last car in the train has its key B set to the intermediate position, so that the angle-cock is closed and air cannot pass through the angle-cock to the outside. Now in case the train breaks in two or the hose or train-pipe of a car bursts then the brakes in the front section of the parted train are not applied, as the valve E in the rear angle-cock of the last car in the section immediately closes against the tension of the spring G, owing to the preponderance of the pressure on the said valve E. Thus the escape of air at the rear car of the front section of the train is prevented, and consequently this part of the train is fully under the control of the engineer. The forward angle-cock in the rear section of the parted train remains open, as the valve-stem $E'$ does not permit a closing of the valve E, owing to the inner end of the valve-stem $E'$ being out of register with the recess $d$. Now it is evident that the air in the rear section of the train can exhaust through this angle-cock to cause an application of the brakes. Thus this parted or rear section has its brakes immediately applied, and consequently the section is brought to a standstill even if a break should occur on a grade.

Having thus described my invention, I claim as new and desire to secure by Letters Patent—

1. An angle-cock, having a key formed with two ports opening into one end of the angle-cock body, the other ends of the said ports being adapted to register with a port leading to a chamber formed in the angle-cock body, a valve adapted to be seated on a seat formed in the said chamber, and a spring for normally holding the said valve off the said seat, substantially as shown and described.

2. An angle-cock, having a key formed with two ports opening into one end of the angle-cock body, the other ends of the said ports being adapted to register with a port leading to a chamber formed in the angle-cock body, and a valve adapted to be seated on a seat formed in the said chamber, the said valve being secured on a valve-stem adapted to engage a recess in the said key, to permit the said valve to move to its seat, substantially as shown and described.

3. An angle-cock having a casing provided with a key-seat and a chamber at one side of the key-seat and communicating therewith by a port, a key operating in the key-seat and having two ports each capable of having one end registered exclusively with the port leading to the chamber, and a valve within said chamber, the valve controlling the port leading to the chamber, substantially as described.

4. An angle-cock having a casing provided with a key-seat and with a chamber communicating with the key-seat through a port, a key operating in the key-seat and having two ports, each port being capable of registering exclusively with the port leading to the chamber, a valve commanding the chamber, and a stem for the valve, the stem moving with the valve and the key having a recess into which the stem of the valve may move, substantially as described.

5. An angle-cock having a casing provided with a key-seat and with a chamber communicating with the key-seat through a port, a key having two ports each capable of exclusively registering with the port and the key also having a recess, a valve commanding the chamber, and a stem for the valve, the stem being capable of entering the recess in the key whereby to permit the valve to close, substantially as described.

6. An angle-cock having a casing provided with a key-seat and with a chamber communicating with the key-seat through a port, a key having two ports and a recess, each port in the key being capable of exclusively registering with the port in the casing, a valve-stem moving in the casing and into the recess of the key when the key is adjusted with certain of its ports at the port of the casing, and a valve carried by the stem and commanding the port of the casing, substantially as described.

7. An angle-cock having a casing provided with a key-seat and a chamber communicating with the key-seat through a port, the chamber having a valve-seat adjacent to the port, a key fitted within the key-seat and having two ports and a recess, the ports of the key being each capable of exclusively registering with the port of the casing, a spider held within the chamber, a valve-stem slidable within the spider and capable of having one end projected into the recess of the key when the key is adjusted to a certain position, and a valve carried by the stem and coöperating with the valve-seat of the chamber, substantially as described.

THOMAS A. OUTHOUSE.

Witnesses:
  ISODOR RUBINSTEIN,
  BRUNO ARKEBAUER.